Dec. 18, 1951     E. N. GILLETTE     2,578,796
THERMOSTATIC CONTROLLED PRESSURE OPERATED MIXING FAUCET
Filed July 14, 1950     2 SHEETS—SHEET 1
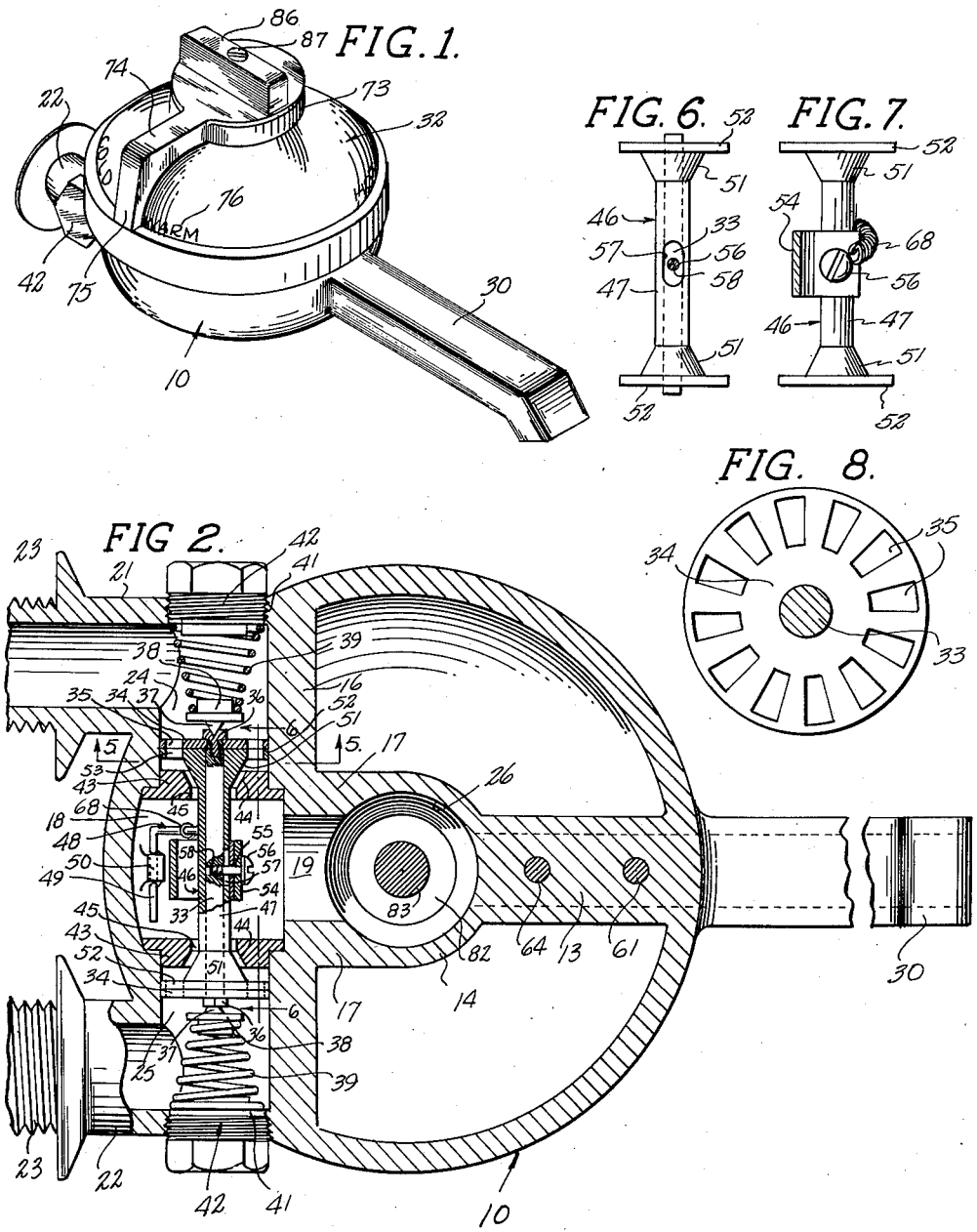
Inventor
EDGAR N. GILLETTE,
By
McMorrow, Berman & Davidson
Attorneys.

Dec. 18, 1951 E. N. GILLETTE 2,578,796
THERMOSTATIC CONTROLLED PRESSURE OPERATED MIXING FAUCET
Filed July 14, 1950 2 SHEETS—SHEET 2

Inventor
EDGAR N. GILLETTE,

By
McMorrow, Berman + Davidson
Attorneys

Patented Dec. 18, 1951

2,578,796

UNITED STATES PATENT OFFICE 2,578,796

THERMOSTATIC CONTROLLED PRESSURE OPERATED MIXING FAUCET

Edgar N. Gillette, Mercedes, Tex.

Application July 14, 1950, Serial No. 173,845

6 Claims. (Cl. 236—12)

1

My invention relates to a thermostatically controlled mixing faucet.

A primary object of the invention is to provide a thermostatically controlled fluid pressure operated mixing faucet for supplying water to wash basins and the like at an even or uniform controlled temperature, regardless of temperature variations and pressure changes in the hot and cold water supply lines.

A further object is to provide a mixing faucet of the above mentioned character which is highly simplified, compact, sturdy and durable in construction and neat and attractive in appearance.

A further object is to provide a mixing faucet of the above mentioned character which embodies a thermostatic element, functioning as a pilot or control device for a pressure responsive valve element, in turn actuated by fluid pressure in incoming hot and cold water lines, to regulate the volume of flow from such lines into a mixing chamber of the faucet.

A further object is to provide a thermostatic mixing faucet which also acts as a pressure equalizer or regulator between the hot and cold water supply lines, so that if there is a sudden lessening of pressure in one line, the greater pressure of the other line will automatically move or shift a regulator valve in such a manner as to lessen the flow of water from the line having the greater pressure and increase the flow of water from the line with the reduced pressure.

A further object resides in the provision of a thermostatic mixing valve which is effective, when closed, to preclude a flow of cold water into the hot water line or vice versa.

A still further object of the invention is to provide a mixing faucet of the above mentioned character which is reliable and efficient in operation and relatively inexpensive to manufacture.

Other objects and advantages of the invention will be apparent during the course of the following description.

In the accompanying drawings, forming a part of this application, and in which like numerals are employed to designate like parts throughout the same, Figure 1 is a perspective view of a hot and cold water mixing faucet embodying my invention;

Figure 2 is an enlarged horizontal sectional view through the faucet of Figure 1, parts broken away and part in elevation;

2

Figure 5:
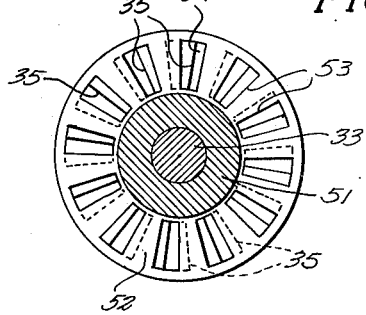

Figure 5 is an enlarged transverse vertical sectional view taken on line 5—5 of Figure 2, parts omitted, Figure 6 is a side elevational view of a fluid pressure operated control device removed, Figure 7 is a similar view of the control device with a thermostatic element applied thereto, and Figure 8 is a side elevational view of a slotted valve disc, part in section.

In the drawings, where for the purpose of illustration is shown a preferred embodiment of my invention, the numeral 10 designates generally a faucet body or valve casing which may be substantially spherically rounded at its bottom side for compactness and neatness, and having a straight top face 11 provided with a large recess 12 forming a chamber. The spherically rounded body or casing 10 is hollowed out as shown in Figure 2, except for a central radially extending wall or web 13 which extends from the side wall of the casing to a central vertical or axial substantially tubular boss or wall 14 and integrally connected with the casing side and boss, as shown. The top of the central tubular boss 14 is flush with the top face 11, but the top of the radial web or wall 13 terminates below the top face 11, as at 15, Figure 3. The hollowed out interior of the casing 10 upon opposite sides of the web 13 and tubular boss 14 communicate with and form a continuous or unitary chamber with the recess 12 in the top of the casing 10. The casing 10 is further provided internally with a transverse web or wall 16, having its outer ends integrally secured to the side wall of the casing and its inner ends integrally secured to short laterally spaced parallel extensions or walls 17 which extend tangentially from the cylindrical or tubular boss 14, as shown. The walls 16 and 17, like the tubular boss 14 extend to the flat top face 11 of the casing 10, and the radial web or wall 13, boss 14 and walls 16 and 16 may form a solid mass extending to the spherically rounded bottom of the casing 10, before such casing is machined in the making of my faucet. In this connection, in order to clearly understand the construction of the casing 10, it should be understood that the portion of the casing to the left of the transverse wall 14, Figure 2, and from the top face 11 to the bottom of the casing may be solid before machining, except for a central recess or cavity 18, opening through the top of the casing at the longitudinal center of the wall 16 and leading into the longitudinal passage or channel 19 between the walls 17. The cavity 18 has a cylindrically curved bottom 20 spaced a substantial distance below the bottom of the passage 19, Figure 3.

Laterally spaced parallel tubular hot and cold water inlet nipples 21 and 22 are integrally secured to the rear side of the body or casing 10 at substantially the elevation of the passage 19, and the outer or rear ends of the nipples 21 and 22 are screw threaded as at 23 for connection with hot and cold water inlet lines or pipes, not shown. The bores of the nipples 21 and 22 lead directly into axially aligned transverse cylindrical bores or passages 24 and 25, formed in the casing 10 between the wall 16 and adjacent portion of the side wall of the casing between the nipples 21 and 22. The inner opposed ends of the bores 24 and 25 are spaced apart as shown, and open into the central cavity or recess 18. The top of the cavity 18 opens through the top face 11 of the casing 10, so that the bores 24 and 25 communicate not only with the cavity 18 and passage 19, but also with the hollowed out interior of the casing forming the chamber with the top recess 12. The bores 24 and 25 however are complete cylindrical bores which are closed or imperforate about their entire circumferences.

The short pasage 19 leads into a central cylindrical recess 26 formed in the top of the boss 14 and opening at its top into the main chamber including the recess 12. The bottom of the recess 26 is provided with a downwardly conically tapered opening or bore 27, leading into a short vertical passage or bore 28, in turn leading into a central longitudinal straight passage or bore 29, which becomes the bore or passage through a radial water outlet extension or spout 30, integrally secured to the forward side of the casing 10 remote from the nipples 21 and 22. The spout 30 is arranged at an elevation somewhat below the nipples 21 and 22, as shown, and the spout is disposed at the transverse center of the casing 10 between the nipples 21 and 22. The upper end of the casing 10 is screw threaded as at 31 for receiving a spherically rounded screw threaded cover or dome 32 to be described later in detail.

An elongated straight cylindrical rotatable shaft or rod 33 is arranged centrally within the bores 24 and 25 and extends across the cavity 18 as shown. The opposite ends of the shaft 33 are rigidly secured within central openings formed in flat circular valve discs or plates 34, having their peripheries sluidably and rotatably engaging the bores 24 and 25 and forming substantially liquid tight seals therewith. The valve discs 34 thus bodily support the rod or shaft 33 centrally within the bores 24, and form with the rod 33 a unit which is rotatable within the bores 24 and 25 and axially shiftable therein. The valve discs 34 are provided with a plurality of circumferentially equidistantly spaced openings or slots 35, through which water from the nipples 21 and 22 is adapted to flow for entering the cavity 18 and interiors of the casing 10 and dome 32. The slots 35 extend radially of the valve discs 34 and have their inner and outer ends terminating between the central openings carrying the rod 33 and the peripheries of the disc 34.

The rod or shaft 33 is provided in its opposite ends with screw threaded openings for receiving bearing screws 36, provided in their heads with conical recesses forming seats for conical centering points 37, formed upon the inner ends of floating spring keepers or retainers 38. Conically tapered compressible coil springs 39 are mounted within the bores 24 and 25 and have their inner ends seated or retained by the keepers 38 and their outer ends engaging shoulders 41 of screw threaded spring centering and adjusting plugs 42, mounted in screw threaded openings in the side walls of the nipples 21 and 22, as shown. The tension of the springs 39 should be equal, and the springs may have their tensions adjusted by turning the screw threaded plugs 42.

A pair of opposed valve plates 43 are fixedly mounted within the inner ends of the bores 24 and 25, and provided with axially aligned conically tapered seats 44 formed in their sides nearest the valve discs 34, and leading into openings or bores 45 extending through the opposite sides of the valve plates 43 and leading into the cavity 18.

A fluid pressure operated spool valve 46 is provided, and includes a straight cylindrical tube or sleeve 47, longitudinally slidably mounted upon the rod or shaft 33, but held against rotation relative to the casing 10 by an L-shaped extension or arm 48, rigidly secured to the sleeve 47, and including a longitudinal portion or extension 49, slidably mounted in an apertured guide lug 50, which holds the arm 48 against rotation and permits it to shift longitudinally of the rod 33. The tube or sleeve 47 is provided at its opposite ends with enlarged conically tapered heads or valve elements 51, adapted to seat against the conically tapered seats 44 of the valve plates 43. The heads 54 are spaced apart longitudinally a slightly greater distance than the valve seats 44, so that the heads or valve elements 51 cannot be seated simultaneously against the seats 44. When one of the valve elements or heads 51 is entirely closed, the other one is entirely opened. Likewise, when one valve element 51 is partially opened the other valve element 51 is also partially opened. An additional pair of axially shiftable and non-rotatable flat circular valve discs 52 are rigidly secured to the ends of the heads 51, so that the ends of the heads and valve discs 52 lie flat against and slidably contact the rotatable valve discs 34. The peripheries of the valve discs 52 slidably engage the bores 24 and 25, and there is no axial play or movement between the pairs of discs 34 and 52. The discs 52 are arranged axially inwardly of the discs 34, as shown, and provided with a plurality of circumferentially equidistantly spaced slots 53, which are adapted to register or partially register with the slots 35 of the discs 34. There is sufficient space between the slots 35 and 53 of the discs 34 and 52, so that the respective slots of the discs may be moved entirely out of registration for completely blocking the flow of water from the nipples 21 and 22 through the bores 24 and 25. The circumferential spacing of the slots in the discs 34 and 52, and the out of phase positioning of the discs 34 are such that the companion slots 35 and 53 at one end of the rod 33 are in complete registration, when the corresponding slots at the other end of the rod 33 are completely out of registration or closed.

A substantially involute shaped bimetallic thermostatic element or spring 54 has one end extending beneath the sleeve 47 and arranged adjacent to the inner side thereof, or the side nearest the passage 19. Such end of the thermostatic element 54 has an aperture 55 for receiving a screw 56, which extends through a longitudinally elongated slot 57 formed in the side wall of the sleeve 47, the screw engaging in a screw threaded opening 50, formed transversely in the rod 33. The screw 56 thus rigidly secures one end of the spring or thermostatic element 54 to the rod 33, and the width of the slot 57 is substantially greater than the diameter of the screw 56, so that the screw will not prevent the rod 33 from rotating or turning a slight distance within the sleeve 47. This relative turning movement of the rod 33 within the sleeve 47 is necessary for shifting the companion slots 35 and 53 of the discs into and out of registration. The opposite or free end of the thermostatic spring 54 is spaced above and laterally inwardly of the sleeve 47, and such free end of the spring 54 carries an adjustable upstanding screw 59, having its bottom end engaging a flat elongated longitudinally extending spring strip or plate 60, having its forward end secured to the top 15 of the web 13 by a screw 61 or the like. The spring plate 60 is biased upwardly or toward the screw 59 by a compressible coil spring 62, seated in a recess 63, formed in the top of the web 13. The head of an upstanding screw 64 engages the top of the plate or strip 60 to limit its upward movement, and the screw 64 extends through the spring 62 and engages in a screw threaded opening in the top of the web 13. At its end nearest the thermostatic element 54, the spring plate 60 is enlarged for forming a wide flat portion or ring 65, having a substantially central opening 66 arranged concentric with the valve seat 27. A transverse straight raised rib or projection 67 is formed upon the ring portion 65 near and inwardly of the adjacent end of the thermostatic spring 54, Figure 3. The thermostatic element 54 is so designed that when it comes into contact with hot water, it tends to expand or open up. An auxiliary retractile coil spring 68 has one end secured beneath the head of the screw 56, and the spring extends beneath and about the sleeve 47, and has its other end secured to the L-shaped arm 48. Since the arm 48 is secured to the non-rotatable sleeve 47, the retractile spring 68 exerts an opposite or counter-pull against the thermostatic spring 54, tending to counteract its expanding action due to contact with hot water. Since the lower end of thermostatic spring 54 is secured to the rod 53, its upper or free end carrying the screw 59 will exert a downward force against the free portion or ring 65 of the spring strip 60. Likewise, when the element 54 comes into contact with cold water and has its temperature decreased, it will tend to coil up or close, and since its lower end is secured to the rotatable rod 33, its upper end carrying the screw 59 will be lifted from the free end of the spring strip 60. When the thermostatic spring 54 comes into contact with hot water, and tends to expand or open up, as previously stated, the spring strip 60 resists the downward urge of the screw 59, and this causes the shaft or rod 33 connected with the other end of the element 54 to rotate within the sleeve 47, a distance limited by the width of the slot 57. The spring 68 is weaker than the thermostatic spring 54, and serves only to hold the upper end of the springs 54 carrying the screw 59 down upon the spring strip 60. The spring 68 rotates the rod 33 back to its original position if the flowing water in the cavity 18 becomes too cold, after the thermostatic spring 54 has turned the rod in one direction responsive to contact with hot water.

The interior of the spherically rounded dome or cap 32 is in communication with the recess 12, cavity 18 and the rest of the interior chamber of the body or casing 10. The dome 32 has a flat top surface 69, parallel to the upper surface 11, and provided centrally with an opening or bore 70, concentric with the valve seat 27. A depending vertical tube or sleeve 71 is rotatably mounted within the bore 70 and has a screw threaded end 72 projecting above the flat face 69 and secured within a screw threaded opening formed centrally in a flat control knob or disc 73, including an integral radial circumferentially swingable extension or arm 74, integral therewith, and carrying a depending pointer or gauge extension 75 for coaction with a water temperature regulator scale 76, graduated with the words or designations "Cold," "Hot" and "Warm," Figure 1. The pointer extension 75 is rotatable about the outer surface of the dome 32 for regulating the temperature of the water discharged from the spout 30, and the tube or sleeve 71 turns with the pointer 75 of the knob 73. The tube 71 has an integral shoulder 77, engaging the top of the dome 32 to prevent the tube from passing upwardly through the bore 70.

Figure 3:
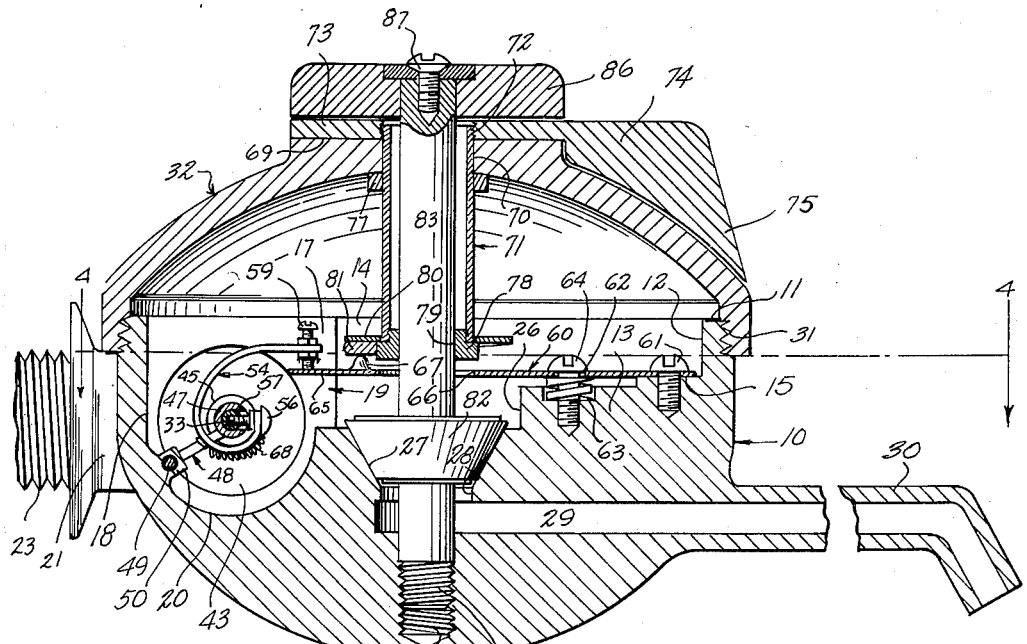
Figure 3 is a central vertical longitudinal sectional view through the faucet.
Figure 4:
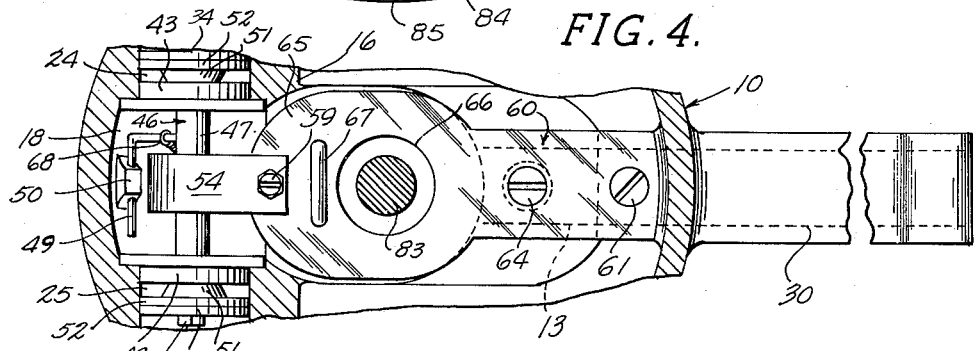
Figure 4 is a fragmentary horizontal sectional view taken on line 4—4 of Figure 3.

The lower end of the tube or sleeve 71 terminates near and above the spring strip 60, Figure 3, and has a bushing 78 rigidly secured thereto and having a bore 79 which is concentric with the tapered valve seat 27 and smaller in diameter than the bore of the tube 71. A flat circular disc or plate 80 is rigidly secured to the lower end of the sleeve 71 and seated against a shoulder on the bushing 78, as shown, and this disc 80 projects radially beyond the periphery of the sleeve 71 as shown. A generally flat wedge shaped control cam or disc 81 is rigidly secured to the bottom face of the disc 80 and surrounds the bushing 78, and this wedge shaped cam engages the top of the raised projection or rib 67 for regulating the position of the spring strip 60 and its ring 65 engaging the screw 59. When the knob 73 is turned, the sleeve 71 and cam 81 turn with it as a unit for elevating or lowering the spring strip 60.

A conically tapered main or flow control valve 82 is provided, for engagement with the seat 27, and this valve 82 is rigidly secured to an elongated straight cylindrical stem or rod 83 which extends above and below the valve element 82, and has a bottom screw threaded extension 84 for engagement in a screw threaded opening 85 formed in the bottom of the casing 10 below the longitudinal passage or bore 29. The upper portion of the valve stem 83 extends through the bore 79 of the bushing 78 and entirely through the sleeve or tube 71 and above the control knob 73, as shown. A suitable knob or handle 86 is rigidly secured to the top end of the valve stem 83 by a screw 87 or the like, and this knob 86 is grasped for turning the stem 83 for opening and closing the main valve element 82. The knobs 73 and 86 and their associated elements are rotatable relative to each other and relative to the stationary casing or body 10.

The operation of my mixing faucet is as follows:

The interiors of the dome or cap 32 and body or casing 10 are in direct communication with the hot and cold water flowing into the faucet through the nipples 21 and 22. The hot and cold water enters the faucet through the bores 24 and 25, and thence into the cavity 18 which is open at the top of the casing 10, as previously stated, so that the entire main cavity or chamber of the casing 10 and cap 32 is normally filled with water.

The purpose of the mixing faucet is to supply water through the spout 30 at any desired temperature, depending upon the setting of the pointer 75, and keeping this temperature constant or uniform at all times, regardless of variations in the temperature of the hot and cold water flowing into the faucet through the nipples 21 and 22, and regardless of pressure variations in the incoming hot and cold water lines. In accomplishing these results, the thermostatic spring 54 functions as a pilot or automatic control device, responsive to changes in temperature of the water entering the cavity 18, and the thermostatic spring 54 controls the rotation of the rod or shaft 33, which in turn regulates the degree of registration of the disc slots 35 and 53. The discs 34 and 52 at the opposite ends of the spool valve 46 constitute a pressure responsive device, actuated by the pressure of the incoming streams of hot and cold water from the nipples 21 and 22. After the temperature responsive element 54 determines the position of the slots 35 and 53, the pressure responsive valve unit or spool 46 is shifted axially or longitudinally within the bores 24 and 25 to vary the size or degree of opening of the passages between the seats 44 and tapered head 51, to thus control the volume of flow of the hot and cold water into the mixing cavity 18.

Assuming that the control pointer 75 is set so that the mixing faucet will furnish warm water, Figure 1, the wedge shaped control cam 81 will properly adjust the elevation of the spring strip 60 through contact with the upstanding projection 67 to produce the desired conditions. The counter-spring 68 will tend to maintain the screw 59 in contact with the ring portion 65 of the spring strip 60 at all times, and the thermostatic spring 54 will be tensioned by the setting of the cam 81 to position the shaft or rod 33 properly for introducing the correct proportions of hot and cold water into the mixing faucet to make up the desired warm water. The slots 35 and 53 at the opposite ends of the spool valve 46 will be arranged in partial registration so that the proper amount of hot and cold water flowing from the nipples 21 and 22 may enter the cavity 18 and interiors of the casing 10 and cap 32. Assume now that the temperature of the incoming hot water suddenly increases, so that the temperature of the mixed hot and cold water in the cavity 18 increases beyond the temperature called for by the pointer 75. This water with the increased temperature will contact the thermostatic spring 54 and cause it to expand or open up. Since the bottom end of the spring 54 is secured to the rod 33, the upper end of the spring carrying the screw 59 will exert a downward force against the ring 65. The ring 65 will resist this downward force, and this causes the rod 33 to rotate within the sleeve 47. The rod 33 rotates in such a direction that the slots 35 and 53 adjacent to the hot water nipple 21 are closed a certain amount or shifted further out of registration. The corresponding slots 35 and 53 adjacent to the cold water nipple 22 are correspondingly shifted further into registration. This causes pressure to be built up in the bore 24 behind the adjacent disc 34 on the hot water side of the faucet, causing the entire spool valve 46 to shift toward the relatively low water pressure in the cold water nipple 22 and bore 25. The tapered head or valve element 51 nearest the nipple 21 moves further into the adjacent tapered seat 44 and reduces the flow of hot water into the cavity 18. At the same time, the other tapered head or valve element 51 moves further out of the adjacent seat 44 nearest the cold water nipple 22 for increasing the flow of cold water into the cavity 18. The temperature of the mixed hot and cold water in the interior of the faucet is thus reduced the required number of degrees to make the warm water called for by the control pointer 75.

The actual dispensing of the water from the faucet is manually controlled by means of the knob 86 for opening and closing the main valve 82, as is obvious. The counter spring 68 will return the rod 33 to its original position if the water in the mixing cavity 18 becomes too cold, according to the setting of the pointer 75. The balanced or equalized compression springs 39 resist movement of the spool valve 46 in either direction, to prevent over-control or hunting of the spool valve. In other words, the springs 39 are provided so that the pressure responsive spool valve 46 will not be too sensitive to slight variations or fluctuations in water pressure. Excessive pressure is built up when the spool valve 46 is shifted toward either of the valve plates 43, as the tapered heads 51 approach the tapered seats 44, reducing the volume of flow from one of the inlet nipples and correspondingly increasing the water pressure upon that side of the faucet. The springs 39 counteract this build up of pressure to prevent over-control or hunting of the pressure responsive spool valve.

When the valve 82 controlled by handle 86 is closed to discontinue flow of water from the mixing valve the handle 74 will be moved to one of its limiting positions causing relative rotation of the corresponding apertured discs to bring the apertures out of registry and close the corresponding passage 24 or 25. This prevents hot water from entering the cold water line or vice versa and eliminates the necessity of placing check valves in the hot and cold water passages to prevent flow of water from one such passage into the other in response to a difference in pressure of the water in the two passages. This is particularly useful in large buildings, such as hotels, where a large number of mixing valves may be connected to the same hot and cold water pipes.

I wish to point out at this time that the conical points 37 cause substantially no friction in opposition to the rotation of the rod 33.

It is to be understood that the form of my invention herewith shown and described is to be taken as a preferred example of the same, and that various changes in shape, size and arrangement of parts may be resorted to, without departing from the spirit of the invention or the scope of the subjoined claims.

Having thus described my invention, I claim:

1. A mixing faucet comprising a body having a mixing chamber and a discharge passage leading from said chamber, main valve means connected with the discharge passage for controlling the dispensing of fluid therefrom, the body having axially aligned inlet bores leading into the mixing chamber, a thermostatic spring disposed within the mixing chamber between the aligned bores, manually operated control means connected with the body and engaging the thermostatic spring to change its tension, slotted rotary valve discs mounted within the aligned inlet bores for partially blocking the flow of fluid therefrom into the mixing chamber, a rod connecting the slotted discs and extending into the mixing chamber and connected with the thermostatic spring and rotated thereby, and a pressure responsive non-rotatable spool valve slidably mounted upon the rod connecting the slotted discs and including companion slotted discs which coact with the first named slotted discs to regulate the pressure within the inlet bores, the spool valve being shiftable longitudinally of the inlet bores for controlling the volume of fluid flowing from such bores into the mixing chamber.

2. A mixing faucet comprising a body having a mixing chamber and a discharge passage leading from said mixing chamber, a manually operated valve connected with the body and engaging the discharge passage to control the flow of fluid therethrough, the body having aligned inlet bores leading into the mixing chamber, a thermostatic spring disposed within the mixing chamber, rotary cam means secured to the body and engaging the thermostat spring to change its tension, slotted discs rotatably mounted within the inlet bores, a rotatable rod connecting said slotted discs and secured to the thermostat spring, a sleeve valve longitudinally slidably mounted upon the rod and provided at its opposite ends with slotted discs slidably contacting the first named slotted discs and coacting therewith to control the fluid pressure within the inlet bores, means connected with the sleeve valve to prevent it from turning and permitting it to move longitudinally within the inlet bores responsive to changes in pressure within such bores, and resilient means connected with the sleeve valve to dampen its movements in both directions longitudinally of the inlet bores.

3. A mixing faucet comprising a body having a mixing chamber and an outlet passage leading from the mixing chamber, a manually operated valve for the outlet passage and connected with the body, the body having inlet passages leading into the mixing chamber, a thermostat spring disposed within the mixing chamber, a rotary valve element secured to the thermostat spring and extending into said inlet passages, the spring turning the rotary valve element responsive to changes in temperature of fluid in the mixing chamber, a fluid pressure responsive valve element slidably connected with said rotary valve element and extending into the inlet passages and shiftable longitudinally therein to control the volume of flow through the inlet passages, a spring plate secured to the body and having a free end engaging the thermostat spring and resisting movement of the thermostat spring in one direction, and rotary cam means connected with the body and engaging the spring plate for shifting the free end of the spring plate toward and away from the thermostat spring.

4. A mixing faucet comprising a body having a mixing chamber and a discharge passage leading from the mixing chamber, a manually operated main valve for the discharge passage of the body and connected with the body, the body having axially aligned inlet bores having spaced apart inner ends opening into the mixing chamber, valve plates secured within said inner end of said inlet bores and having tapered seats, an axially shiftable spool valve extending into the inner ends of the inlet bores and having tapered heads for engaging the tapered seats, slotted discs secured to the tapered heads of the spool valve and disposed within the inlet bores for partially blocking the flow of fluid therein, means connected with the spool valve to prevent it from turning while permitting it to move longitudinally within said inlet bores, the spool valve having a bore, a rod rotatably mounted within the bore of the spool valve, companion slotted discs secured to the ends of the rod and engaging the slotted discs of the tapered heads, a thermostat spring disposed within the mixing chamber and having one end disposed adjacent to a side of the spool valve, said side of the spool valve having a slot, a screw engaging in the rod and extending through the slot and engaging the adjacent end of the thermostat spring for securing such spring to the rod, the thermostat spring rotating the rod responsive to changes in temperature within the mixing chamber to shift the slots of the first and second mentioned slotted discs into and out of registration, and manually operated means connected with the thermostat spring for adjusting its tension.

5. A mixing faucet comprising a body having a mixing chamber therein, a discharge passage connected at one end to said mixing chamber and extending through said body and inlet passages connected to said inlet chamber and disposed at respectively opposite sides of said outlet passage and in opposition to each other, means providing annular valve seats disposed one in each inlet passage and fixed to said body, a first valve member extending through said mixing chamber and cooperating with the valve seats to alternatively restrict said inlet passages in response to variations in the fluid pressure differential between said passages, means acting between said housing and said first valve member resiliently urging said first valve member to a center position relative to said valve seats, a second valve member extending through said mixing chamber and movable relative to said first valve member to alternatively restrict said inlet passages in response to variations in the temperature of fluid in said mixing chamber, temperature responsive means disposed in said mixing chamber and connected to said second valve member for moving the latter relative to said first valve member, manually operable means carried by said body and engaging said temperature responsive means for selectively adjusting the latter to different temperature settings, and a manually operable main valve carried by said body and operative to open and close said outlet passage.

6. A mixing faucet comprising a body having a mixing chamber therein, a discharge passage connected at one end to said mixing chamber and extending through said body and inlet passages connected to said inlet chamber and disposed at respectively opposite sides of said outlet passage and in opposition to each other, means providing annular valve seats disposed one in each inlet passage and fixed to said body, a first valve member extending through said mixing chamber and including a tubular intermediate portion and valve heads disposed one on each end of said intermediate portion and cooperating with said valve seats upon longitudinal movement of said first valve member relative to said body to alternatively restrict said inlet passages in response to variations in the fluid pressure differential between said inlet passages, a second valve member comprising a stem extending through said first valve member and having valve heads secured one upon each end thereof and cooperating respectively with the valve heads on said first valve member to alternatively restrict said outlet passages in response to rotational movements of said second valve member relative to said first valve member, temperature responsive means in said mixing chamber connected between said body and said second valve member for imparting rotational movement to the latter relative to the first valve member in response to temperature variations of fluid in said mixing chamber, means acting between said first valve member and said body restraining said first valve member against rotational movements relative to said body while providing freedom of longitudinal movement of said valve members, manually operable means carried by said body and engaging said temperature responsive means for selectively adjusting the latter to different temperature settings, and a manually operable main valve carried by said body and operative to open and close said outlet passage.

EDGAR N. GILLETTE.

REFERENCES CITED

The following references are of record in the file of this patent:

UNITED STATES PATENTS

| Number | Name | Date |
|---|---|---|
| 1,873,769 | Lang | Aug. 23, 1932 |
| 1,925,686 | Chism | Sept. 5, 1933 |
| 2,172,489 | Young | Sept. 12, 1939 |